(12) United States Patent
Lau et al.

(10) Patent No.: US 11,081,145 B2
(45) Date of Patent: Aug. 3, 2021

(54) PACKAGING CONTAINER FOR MULTIMEDIA STORAGE CARRIER

(71) Applicant: FINEST PRODUCTS LIMITED., Hongkong (CN)

(72) Inventors: Kwok Din Lau, Hong Kong (CN); Kwan Ming Jimmy Lau, Hong Kong (CN)

(73) Assignee: FINEST PRODUCTS LIMITED., Hongkong (CN)

( * ) Notice: Subject to any disclaimer, the term of this patent is extended or adjusted under 35 U.S.C. 154(b) by 0 days.

(21) Appl. No.: 16/944,193

(22) Filed: Jul. 31, 2020

(65) Prior Publication Data

US 2021/0035611 A1    Feb. 4, 2021

(30) Foreign Application Priority Data

Aug. 2, 2019   (CN) .......................... 201910713737.0

(51) Int. Cl.
*G11B 33/04* (2006.01)
*B65D 25/10* (2006.01)
*B65D 21/02* (2006.01)

(52) U.S. Cl.
CPC ........ *G11B 33/0422* (2013.01); *B65D 25/106* (2013.01); *B65D 21/0212* (2013.01)

(58) Field of Classification Search
CPC .............. G11B 33/0422; B65D 85/544; B65D 25/106; B65D 21/0212
See application file for complete search history.

(56) References Cited

U.S. PATENT DOCUMENTS

| 4,331,242 A | 5/1982 | Scott |
| 4,771,890 A * | 9/1988 | Hofland ................. G11B 23/03 |
| | | 206/308.1 |

(Continued)

FOREIGN PATENT DOCUMENTS

| CN | 1277721 A | 12/2000 |
| CN | 1345066 A | 4/2002 |

(Continued)

OTHER PUBLICATIONS

CNIPA First Office Action corresponding to Application No. 201910713737.0 dated Jun. 2, 2020.

*Primary Examiner* — Brian E Miller
(74) *Attorney, Agent, or Firm* — Yue (Robert) Xu; Apex Attorneys at Law, LLP

(57) ABSTRACT

A packaging container for a multimedia storage carrier includes a panel portion and a peripheral side portion. The panel portion is arranged in the peripheral side portion in a sunken manner, and an inner cavity for accommodating the multimedia storage carrier is defined by the panel portion and an inner wall of the peripheral side portion. An inner edge of the peripheral side portion is provided with a snap portion and a snap groove portion opposite to the snap portion. The snap portion and the snap groove portion are configured to fix the multimedia storage carrier in the inner cavity. The snap portion is provided with a support member that abuts against a bottom surface of the multimedia storage carrier, and the support member is configured to support the multimedia storage carrier.

13 Claims, 11 Drawing Sheets

(56) References Cited

U.S. PATENT DOCUMENTS

| | | | | |
|---|---|---|---|---|
| 5,533,615 A * | 7/1996 | McCamy | ............ | G11B 33/0422 |
| | | | | 206/308.1 |
| 5,690,218 A * | 11/1997 | McCamy | ............ | G11B 33/0422 |
| | | | | 206/303 |
| 5,938,020 A * | 8/1999 | Luckow | ............ | G11B 33/0427 |
| | | | | 206/308.1 |
| 5,944,181 A | 8/1999 | Lau | | |
| 6,155,417 A * | 12/2000 | Flores, Jr. | ............ | G11B 33/0427 |
| | | | | 206/308.1 |
| 6,164,446 A * | 12/2000 | Law | ............ | G11B 33/0422 |
| | | | | 206/308.1 |
| 6,237,763 B1 * | 5/2001 | Lau | ............ | G11B 33/0427 |
| | | | | 206/308.1 |
| 6,454,090 B1 | 9/2002 | Flores, Jr. et al. | | |
| 6,702,110 B1 * | 3/2004 | Flores, Jr. | ............ | G11B 33/0427 |
| | | | | 206/310 |
| 7,051,871 B2 * | 5/2006 | Loritz | ............ | B65D 21/0228 |
| | | | | 206/303 |
| 7,124,422 B2 * | 10/2006 | Yamagishi | ............ | G11B 33/0427 |
| | | | | 720/728 |
| 7,527,148 B2 * | 5/2009 | Crouan | ............ | G11B 33/0422 |
| | | | | 206/308.1 |
| 7,753,200 B2 * | 7/2010 | Goto | ............ | G11B 33/0416 |
| | | | | 206/308.1 |
| 7,841,465 B2 * | 11/2010 | Lu | ............ | G11B 33/0444 |
| | | | | 206/308.1 |
| 2002/0033349 A1 | 3/2002 | Shindo et al. | | |
| 2002/0100701 A1 * | 8/2002 | Chiu | ............ | G11B 33/0427 |
| | | | | 206/308.1 |
| 2002/0139701 A1 * | 10/2002 | Luckow | ............ | G11B 33/0422 |
| | | | | 206/308.1 |
| 2003/0015443 A1 * | 1/2003 | Flores, Jr. | ............ | G11B 33/0427 |
| | | | | 206/310 |
| 2004/0139461 A1 * | 7/2004 | Yamagishi | ............ | G11B 33/0427 |
| | | | | 720/728 |
| 2005/0205441 A1 * | 9/2005 | Goto | ............ | G11B 33/0416 |
| | | | | 206/308.1 |
| 2006/0196789 A1 * | 9/2006 | O'Brien | ............ | G11B 33/0427 |
| | | | | 206/308.1 |
| 2012/0247988 A1 * | 10/2012 | Lax | ............ | G11B 33/0427 |
| | | | | 206/308.1 |

FOREIGN PATENT DOCUMENTS

| | | | | |
|---|---|---|---|---|
| CN | 1347559 A | 5/2002 | | |
| CN | 204056779 U | 12/2014 | | |
| EP | 1128387 A1 * | 8/2001 | ......... | G11B 33/0422 |
| WO | WO-03023783 A1 * | 3/2003 | ......... | G11B 33/0427 |
| WO | WO-2005081252 A1 * | 9/2005 | ......... | G11B 33/0422 |
| WO | WO-2006052987 A2 * | 5/2006 | ......... | G11B 33/0427 |

* cited by examiner

PACKAGING CONTAINER FOR MULTIMEDIA STORAGE CARRIER

CROSS-REFERENCE TO RELATED APPLICATIONS

This application claims the priority to Chinese Patent Application No. 201910713737.0 titled "PACKAGING CONTAINER FOR MULTIMEDIA STORAGE CARRIER", filed with the China National Intellectual Property Administration on Aug. 2, 2019, which is incorporated herein by reference in its entirety.

FIELD

This application relates to the technical field of packaging multimedia storage carriers, and in particular to a packaging container for a multimedia storage carrier.

BACKGROUND

A general-purpose multimedia storage carrier generally includes a central circular positioning hole and an annular peripheral portion, and there is a data storage area between the central circular positioning hole and the annular peripheral portion. A protective container storing this type of multimedia storage carrier has a central support that supportively clamps the multimedia storage carrier by being coupled to the central positioning hole without being in contact with the data storage area at either side of the two sides of the multimedia storage carrier. The multimedia storage carrier can be put into the container by lowering the multimedia storage carrier to the support while clamping the opposite peripheral portions. Then the multimedia storage carrier can be coupled to the central support by pressing a region close to the central hole with a finger. The multimedia storage carrier can be taken out by pressing against the central support with a finger and lifting the peripheral portions at the same time. For this kind of protective containers with the central support for fixing, it is not convenient for putting in or taking out the multimedia storage carrier, and in case of improper use, the multimedia storage carrier may even be damaged, and the data stored therein will be destroyed. In addition, for some large-sized multimedia storage carriers, such as a long play (LP), it is impossible to press against the central support with one hand and clamp the peripheral portions for lifting at the same time. Therefore, it is very inconvenient to store and fetch the multimedia storage carriers by using this kind of protective containers.

In the conventional technology, an uncovered protective tray is also provided, which fixes the data disk also by the central support. This kind of protective trays are stored in a stacked manner. It has been found recently that, when the protective trays are moved, the upper tray will scratch the multimedia storage carrier in the adjacent lower tray, which may destroy the data stored therein.

SUMMARY

An object of this application is to provide a packaging device for multimedia storage carriers, such as long plays (LP), compact discs (CD), and digital versatile discs (DVD), to solve the problems in the conventional technology that the disc is required to be fixed with a central support, it is not smooth and convenient to put in or take out the disc, and when the trays are stored in a stacked manner, the multimedia storage carriers therein may be scratched due to the movement of the trays.

In view of this, a packaging container for multimedia storage carrier is provided according to the present application, which includes a panel portion and a peripheral side portion. The panel portion is arranged in the peripheral side portion, and an inner cavity for accommodating the multimedia storage carrier is defined by the panel portion and an inner wall of the peripheral side portion. The peripheral side portion is provided with a snap portion and a snap groove portion opposite to the snap portion. The snap portion and the snap groove portion are configured to fix the multimedia storage carrier in the inner cavity. The snap portion is provided with a support member that abuts against a bottom surface of the multimedia storage carrier, and the support member is configured to support the multimedia storage carrier. When the support member moves downward, the snap portion is snap-fitted with the multimedia storage carrier, and when the support member moves upward, the multimedia storage carrier is separated from the snap portion.

Preferably, the snap portion further includes a positioning member configured to be snap-fitted with a peripheral portion of the multimedia storage carrier and a pressing member configured to apply force. The support member and the positioning member are respectively connected to the pressing member.

Preferably, an arm member arranged at the pressing member, the pressing member is connected to the panel portion via the arm member, and a portion of the pressing member away from the arm member is in a suspended state.

Preferably, the positioning member includes at least one positioning arm, one end of the positioning arm is connected to the pressing member, and another end of the positioning arm is provided with an end face matching with the inner wall of the peripheral side portion. The end face is provided with a positioning block protruding outward, and an outer end of the positioning block has an upper oblique surface and a lower oblique surface.

Preferably, at least one support member is provided, one end of the support member is configured to abut against the bottom surface of the multimedia storage carrier, and another end of the support member is connected to the pressing member via a first bent portion provided on the support member.

Preferably, the snap groove portion includes a fixed member and a movable member. A snap groove cavity for accommodating the peripheral portion of the multimedia storage carrier is defined by the fixed member, the inner wall of the peripheral side portion, and the panel portion. The movable member is an elastic member which is configured to apply force to the multimedia storage carrier, to drive the multimedia storage carrier to move out from the snap groove cavity.

Preferably, the fixed member protrudes from the inner wall of the peripheral side portion toward the panel portion, and a front end of the fixed member has an upper oblique surface and a lower oblique surface.

Preferably, the movable member has an arc-shaped sheet structure, one end of the movable member is connected with the peripheral side portion, and another end extends downward. The movable member is insertedly arranged in the fixed member, and the end of the movable member extending downward is in a suspended state.

Preferably, the movable member has a V-shaped structure, an opening of the movable member is upward, and a bottom of the movable member has an arc-shaped structure. One end of the movable member is connected with the peripheral side portion, and another end of the movable member is in a suspended state.

Preferably, the movable member is provided with a second bent portion having an S-shaped double-curve structure, and the movable member is connected to the peripheral side portion via the second bent portion.

Preferably, at least two snap groove portions are provided, which are symmetrically arranged at a portion of the peripheral side portion opposite to the snap portion.

Preferably, two snap groove portions are provided, and a central angle formed by the two snap groove portions and a center of the panel portion ranges from 0 degree to 270 degrees.

Preferably, the peripheral side portion is provided with at least one finger-shaped recess which is convenient for the user to grasp the peripheral portion of the multimedia storage carrier.

Preferably, the peripheral side portion is provided with at least one raised portion having an annular structure, a stepped groove is formed by the raised portion and an outer edge of the peripheral side portion, and the stepped groove is configured for placing an outer wall of the peripheral side portion of another adjacent packaging container.

Preferably, a stepped portion for supporting the peripheral portion of the multimedia storage carrier is provided at a junction between the panel portion and the peripheral side portion.

Preferably, a central column portion configured to be coupled to a central hole of the multimedia storage carrier is provided at a center of the panel portion.

Compared with the conventional technology, the present application has the following advantages.

Unlike the traditional protective container for the multimedia storage carrier, in this application, there's no need to rely on the central support to fix the multimedia storage carrier, instead, with the cooperation between the snap groove portion and the snap portion, and the ingenious design of the support member and the positioning member of the snap portion, the multimedia storage carrier can be quickly fixed and released. Besides, the snap groove portion is provided with the elastic movable member, which on the one hand can tightly fix the multimedia storage carrier between the snap groove portion and the snap portion, and on the other hand can automatically eject the multimedia storage carrier from the snap groove portion when the multimedia storage carrier is required to be taken out, thus facilitating the removal operation. Compared with the packaging container having the central support, the multimedia storage carrier can be taken out or placed in smoother with the packaging container according to this application, which can avoid damages to the multimedia storage carrier caused by the central support. Especially for large-sized multimedia storage carriers such as long plays (LP), with the packaging container according to this application, there is no need to press against the central bracket while clamping the peripheral portion with a single hand, which is more inconvenient to place in and take out the multimedia storage carrier. In addition, in the this application, the peripheral side portion is further provided with the raised portion, which provides a stepped groove for placing anther packaging container of the same type, and thus making the packaging container more stable when the packaging containers are stored in a stacked manner. More importantly, by providing the raised portion, in the case of moving the upper packaging container, since there is a certain spatial distance between the upper packing container and the multimedia storage carrier in the lower packaging container, the multimedia storage carrier in the lower packaging container will not be scratched and thus the data therein will not be damaged.

BRIEF DESCRIPTION OF THE DRAWINGS

For more clearly illustrating embodiments of the present application or the technical solutions in the conventional technology, drawings referred to describe the specific embodiments or the conventional technology will be briefly described hereinafter. Apparently, the drawings in the following description are only some examples of the present application, and for those skilled in the art, other drawings may be obtained based on these drawings without any creative efforts.

REFERENCE NUMERALS

Figure 1:
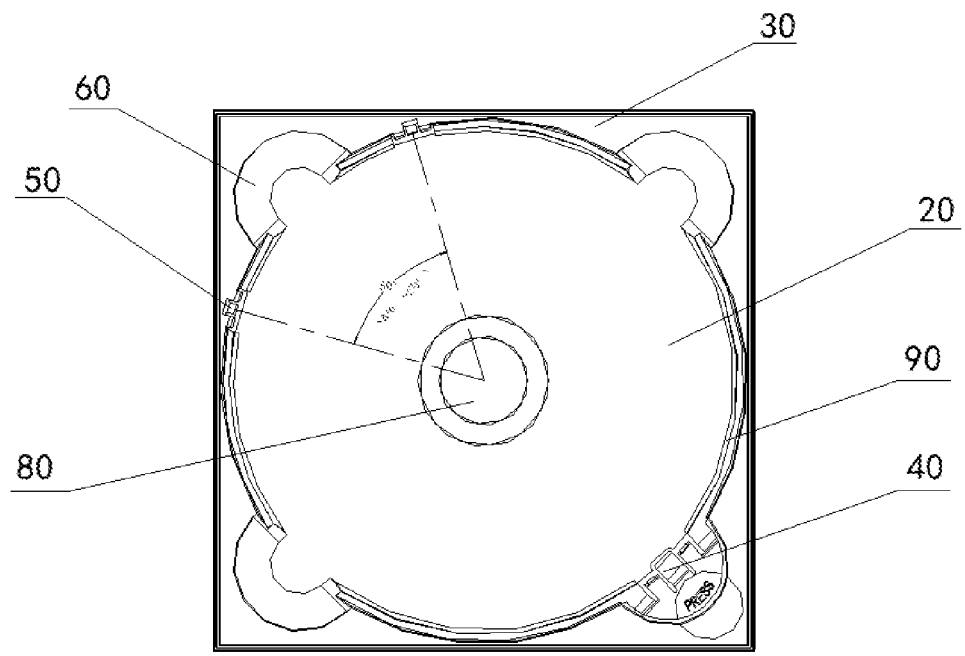
FIG. 1 is a schematic structural view of a first embodiment according to the present application.

| 10 | multimedia storage carrier, | 20 | panel portion, |
|---|---|---|---|
| 30 | peripheral side portion, | 40 | snap portion, |
| 41 | pressing member, | 42 | positioning member, |
| 43 | support member, | 44 | arm member, |
| 45 | positioning arm, | 46 | positioning block, |
| 47 | first bent portion, | 50 | snap groove portion, |
| 51 | movable member, | 52 | fixed member, |
| 53 | second bent portion, | 60 | finger-shaped recess, |
| 70 | raised portion, | 71 | stepped groove, |
| 80 | central column portion, | 90 | stepped portion. |

DETAILED DESCRIPTION OF THE EMBODIMENTS

The technical solution according to the embodiments of the present application will be described clearly and completely as follows in conjunction with the accompany drawings in the embodiments of the present application. It is obvious that the described embodiments are only a part of the embodiments according to the present application, rather than all of the embodiments. All the other embodiments obtained by those skilled in the art based on the embodiments in the present application without any creative work belong to the scope of protection of the present application.

In the description of the present application, it should be noted that the orientation or positional relationship indicated by the terms such as "central", "upper", "lower", "left", "right", "vertical", "horizontal", "inner", and "outer", are based on the orientation or positional relationship shown in the drawings, which are only used to facilitate the description of the present application and to simplify the description, rather than indicating or implying that the devices or elements referred to must have a specific orientation or can only be configured and operated in a particular orientation. Therefore the above-mentioned terms should not be construed as a limitation to the present application. In addition, the terms "first", "second", "third" and the like are only for purpose of description, and should not be construed as indicating or implying relative importance.

Unless otherwise explicitly specified and defined, the terms "mounting", "link" and "connection" should be interpreted in a broad sense, which may be a fixed connection, a detachable connection, or an integral connection; a mechanical connection or an electrical connection; a direct connection, an indirect connection through an intermediate medium, or an internal communication between two components. For those skilled in the art, the specific meaning of the above terms in the present application can be understood in the light of specific circumstances.

First Embodiment

Figure 2:
FIG. 2 is a schematic sectional view of the first embodiment according to the present application.

Referring to FIGS. 1 and 2, a packaging container for multimedia storage carrier is provided according to this embodiment, including a panel portion 20 and a peripheral side portion 30 which are integrally formed by injection molding. The panel portion 20 is a region in the packaging container that matches with a projection of the multimedia storage carrier in a vertical direction. That is, the multimedia storage carrier covers the panel portion 20 when the multimedia storage carrier is stored. The peripheral side portion 30 is a remaining region in the packaging container apart from the panel portion 20. The panel portion 20 is arranged in the peripheral side portion 30 in a sunken manner, that is, the peripheral side portion 30 includes a plane surrounding the panel portion 20, an annular inner wall and an outer wall surrounding an outermost edge of the peripheral side portion 30, and a plane of the panel portion 20 is located below the plane of the peripheral side portion 30. An inner cavity for accommodating the multimedia storage carrier is defined by the panel portion 20 and the inner wall of the peripheral side portion 30, the panel portion 20 serves as a bottom surface of the inner cavity, and the inner wall of the peripheral side portion 30 serves as a periphery of the inner cavity. Of course, according to needs, the panel portion may be arranged in the peripheral side portion without adopting the sunken manner, that is, the panel portion 20 and the peripheral side portion 30 are located in a same plane, an annular raised wall surrounding the panel portion 20 is provided at a junction between the peripheral side portion 30 and the panel portion 20, and an inner cavity for accommodating the multimedia storage carrier is defined by the annular raised wall and the panel portion 20.

A snap portion 40 and a pair of snap groove portions 50 opposite to the snap portion 40 are provided at a junction between the plane and the inner wall of the peripheral side portion 30. In this embodiment, with three-point positioning by the snap portion 40 and the two snap groove portions 50, the multimedia storage carrier can be fixed in the inner cavity formed by the panel portion 20 and the peripheral side portion 30. In order to achieve a good fixing effect, a central angle formed by the two snap groove portions 50 and a center of the panel portion 20 is 60 degrees. Four finger-shaped recesses 60 are evenly arranged on the peripheral side portion 30, so that when the multimedia storage carrier is being taken out, a user can grasp a peripheral portion of the multimedia storage carrier at the finger-shaped recesses 60, so as to lift the peripheral portion and take out the multimedia storage carrier. A central column portion 80 coupled with a central hole of the multimedia storage carrier is provided at the center of the panel portion 20. When the multimedia storage carrier is placed in the inner cavity of the packaging container, the central column portion 80 can enter the central hole of the multimedia storage carrier, and a diameter of the central column portion 80 matches with an inner diameter of the central hole, which can assist in positioning. An annular stepped portion 90 is provided at a junction between the panel portion 20 and the inner wall of the peripheral side portion 30, thus when the multimedia storage carrier is stored, the peripheral portion of the multimedia storage carrier abuts against the stepped portion 90, so that a certain spatial distance is provided between the multimedia storage carrier and the panel portion 20, which can prevent the multimedia storage carrier from being scratched by the panel portion 20.

Figure 3A:
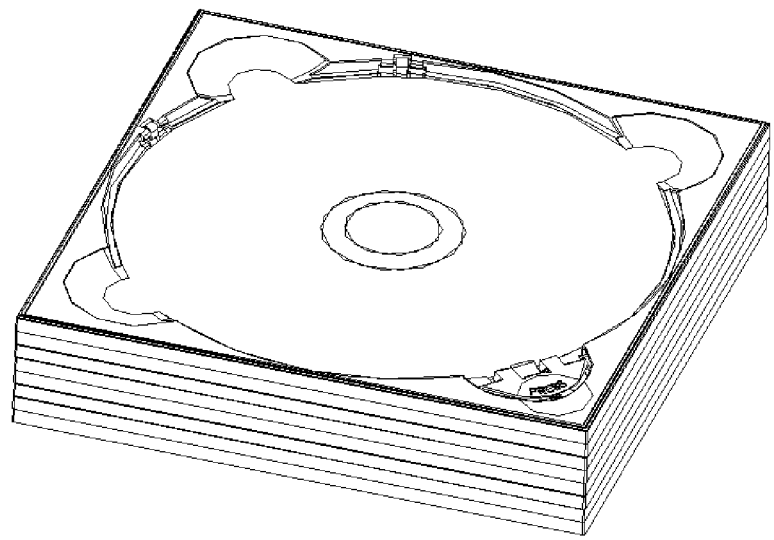
FIG. 3a is a schematic view showing that multiple packaging containers according to the first embodiment of the present application are stacked.
Figure 3B:
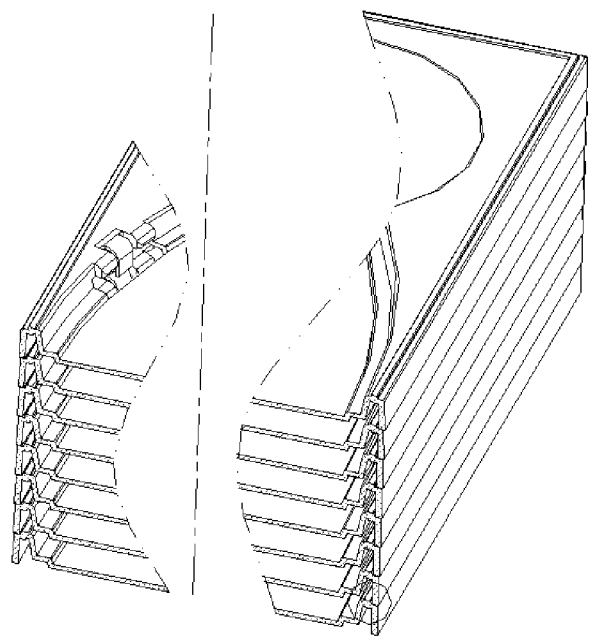
FIG. 3b is a schematic sectional view showing that the multiple packaging containers according to the first embodiment of the present application are stacked.

Referring to FIGS. 3a and 3b, the multimedia storage carrier packaging container according to this embodiment has a tray-like structure. Multiple packaging containers can be stacked together in an up-and-down direction, which is both artistic and space-saving.

Figure 4A:
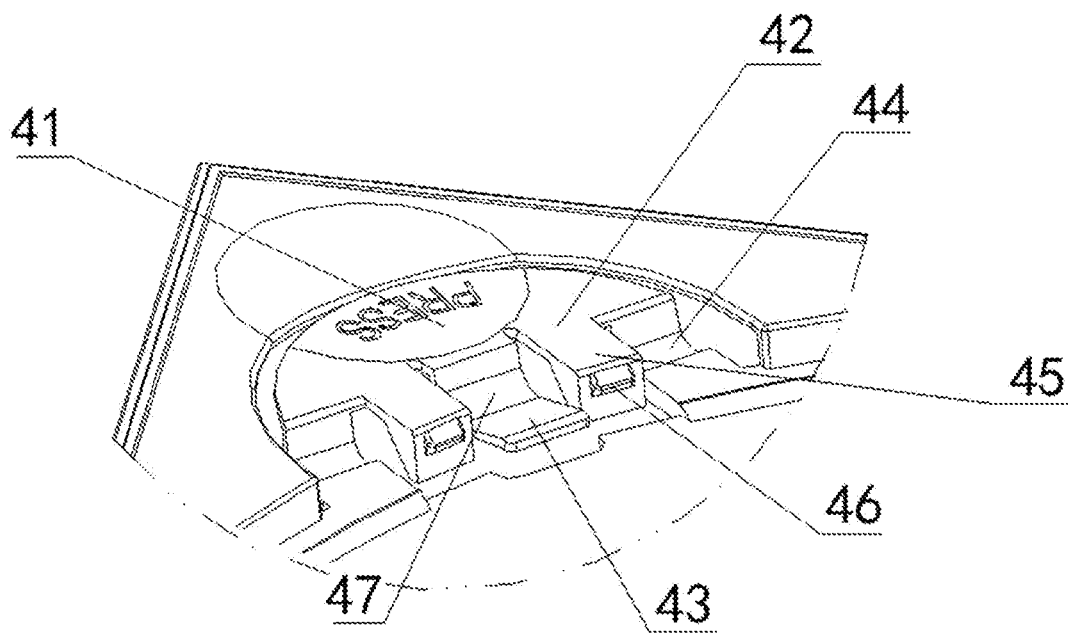
FIG. 4a is a schematic structural view showing a snap portion according to the first embodiment of the present application.
Figure 4B:
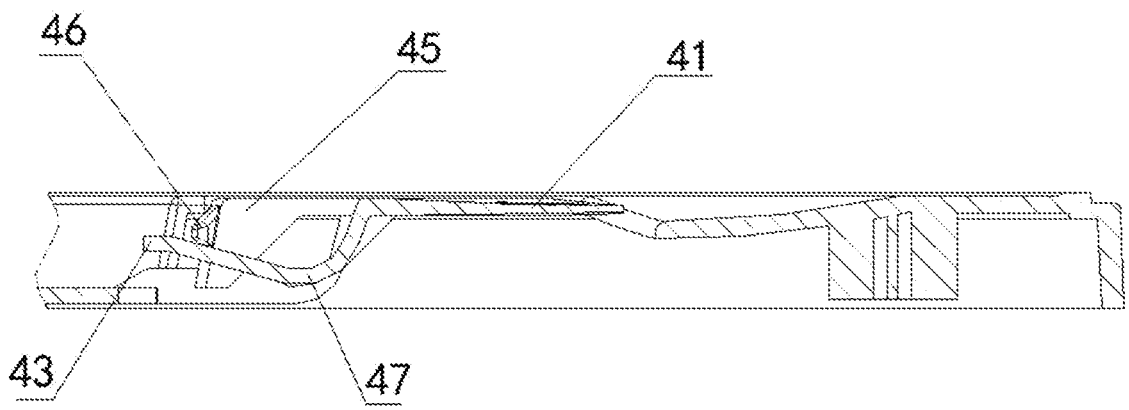
FIG. 4b is a schematic sectional view showing the snap portion according to the first embodiment of the present application.

Referring to FIGS. 1, 4a and 4b, the snap portion 40 of the multimedia packaging container according to this embodiment is arranged in one of the finger-shaped recesses 60, which includes an integrally formed pressing member 41 configured to apply force, a positioning member 42 configured to be snap-fitted with the peripheral portion of the multimedia storage carrier, and a support member 43 configured to abut against a bottom surface of the multimedia storage carrier. The pressing member 41 has a semi-circular sheet structure, which is in a suspended state. The pressing member 41 is connected to the panel portion 20 through a pair of arm members 44, so that the pressing member 41 is flexibly deformed. When in a relaxed state, the pressing member 41 is in the same plane as the peripheral side portion 30, and when in a stressed state, the pressing member 41 is below the plane of the peripheral side portion 30. The positioning member 42 includes a pair of positioning arms 45, which are arranged between the two arm members 44 of the pressing member 41. One end of each of the positioning arms 45 is connected to the pressing member 41, and another end of the positioning arm 45 extends toward the panel portion 20 and is provided with an end face matching with the inner wall of the peripheral side portion 30. The end face is provided with a positioning block 46 protruding outwards, and an outer end of the positioning block 46 has an oblique contour. When the pressing member 41 is relaxed, the positioning block 46 can restrict the movement of the multimedia storage carrier and fix the multimedia storage carrier, and when the pressing member 41 is stressed, the positioning block 46 is separated from the multimedia storage carrier. The support member 43 is arranged between the two positioning arms 45, one end of the support member 43 is configured to abut against the bottom surface of the multimedia storage carrier, and another end of the support member 43 is connected to the pressing member 41 via a first bent portion 47 provided at the support member 43. When the pressing member 41 is relaxed, a lower surface of a front end of the support member 43 abuts against the panel portion 20, and an upper surface of the front end of the support member 43 abuts against the multimedia storage carrier; and when the pressing member 41 is stressed, the support member 43 moves upward to allow the multimedia storage carrier to be separated from the positioning block 46.

Figure 5A:
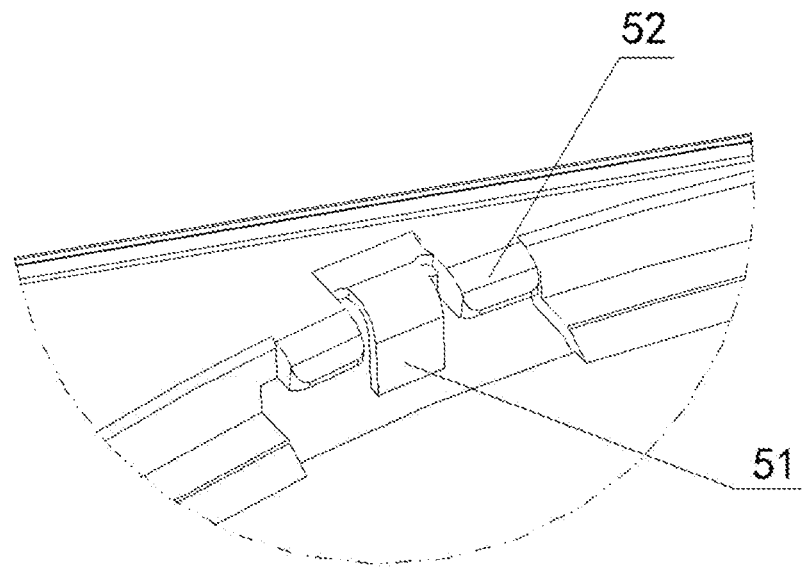
FIG. 5a is a schematic structural view showing a snap groove portion according to the first embodiment of the present application.
Figure 5B:
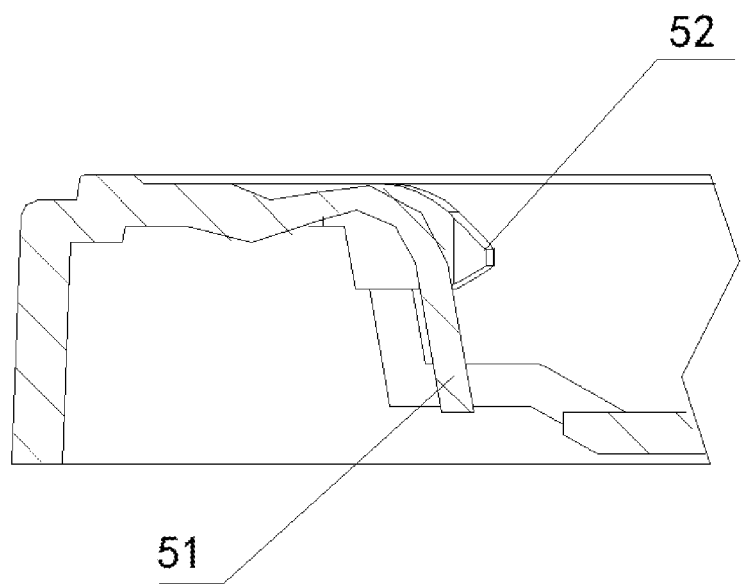
FIG. 5b is a schematic sectional view showing the snap groove portion according to the first embodiment of the present application.

Referring to FIGS. 1, 5a and 5b, each of the snap groove portions 50 of the packaging container according to this embodiment includes a fixing member 52 and a movable member 51. The fixing member 52 protrudes from the inner wall of the peripheral side portion 30 towards the panel portion 20, and a snap groove cavity for accommodating the peripheral portion of the multimedia storage carrier is defined by the fixing member 52 together with the inner wall of the peripheral side portion 30 and the panel portion 20. A front end of the fixing member 52 has an upper oblique surface and a lower oblique surface. The movable member 51 has an elastic arc-shaped sheet structure, one end thereof is connected to the peripheral side portion 30, and another end thereof extends downward. The movable member 51 insertedly arranged in the fixed member 52, and the end of the movable member 51 extending downward is in a suspended state. When the multimedia storage carrier is placed, the peripheral portion of the multimedia storage carrier enters the snap groove cavity to abut against the movable member 51, and press the movable member 51 toward the peripheral side portion 30; and the movable member 51 is flexibly deformed, to apply a force to the multimedia storage carrier toward the panel portion 20. On the one hand, the multimedia storage carrier can be clamped tightly between the snap groove portions 50 and the snap portion 40, and on the other hand, when the snap portion 40 is separated from the peripheral portion of the multimedia storage carrier, the multimedia storage carrier can be ejected out from the snap groove cavity by the movable member 51 which is convenient for taking out the multimedia storage carrier.

Figure 6:
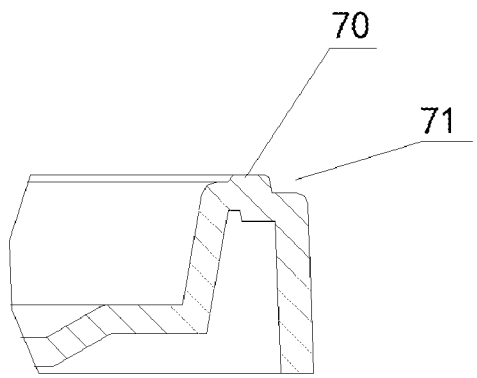
FIG. 6 is an enlarged view of a section of a peripheral side portion according to the first embodiment of the present application.

Referring to FIGS. 1, 2 and 6, the peripheral side portion 30 of the packaging container according to this embodiment is provided with a raised portion 70, a stepped groove 71 is formed by the raised portion 70 and an outer edge of the peripheral side portion 30, and the stepped groove 71 is configured for placing an outer wall of a peripheral side portion of another packaging container located above the packaging container according to the present application.

The packaging container according to this embodiment has a square outline, with a side length of 315.12 mm and a thickness of 6 mm. The packaging container is suitable for storing the long play (LP). Of course, the size of the packaging container may be determined according to needs, for example, the packaging container can be designed to have a size that matches that of a compact disc (CD) or a digital versatile disc (DVD), and the packaging container can also be designed according to the size and shape of an SD card or a credit card for storing SD cards, credit cards, and so on.

A using process of the packaging container for the multimedia storage carrier according to this embodiment is as follows.

Figure 7A:
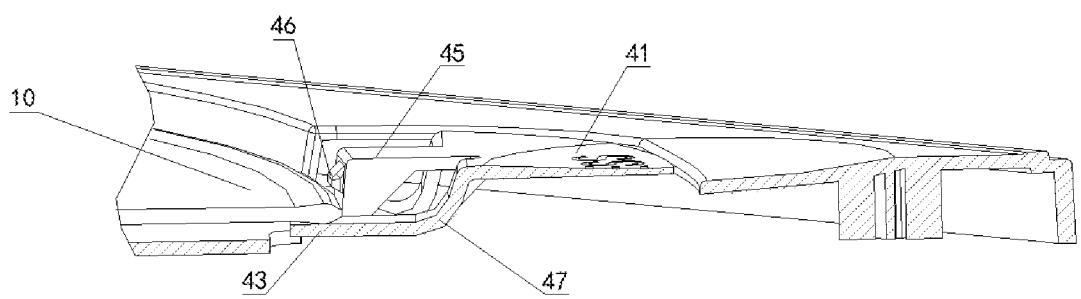
FIG. 7a is a schematic view showing a state of the snap portion when a multimedia storage carrier is stored in a packaging container according to the first embodiment of the present application.
Figure 7B:
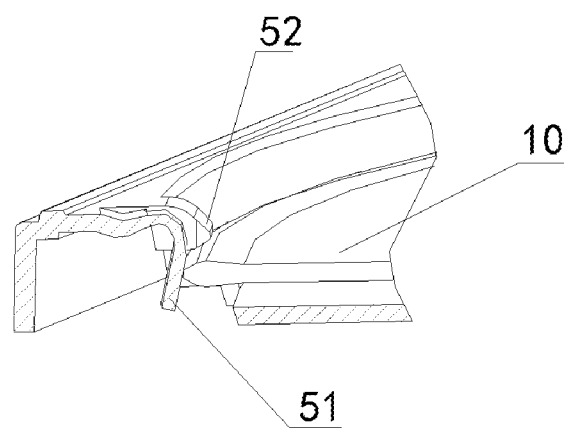
FIG. 7b is a schematic view showing a state of the snap groove portion when the multimedia storage carrier is stored the packaging container according to the first embodiment of the present application.

Referring to FIGS. 7a and 7b, when the multimedia storage carrier 10 is placed, a section of the peripheral portion of the multimedia storage carrier 10 is placed in the snap groove cavity to abut against the movable member 51 of the snap groove portion 50, which presses the movable member 51 and drives the movable member 51 to move toward the peripheral side portion 30; and another section of the peripheral portion abuts against the end faces of the positioning arms 45 of the snap portion 40, and presses the support member 43 against the panel portion 20. The movable member 51 of the snap groove portion 50 and the end faces of the positioning arms 45 of the snap portion 40 restrict the horizontal movement of the multimedia storage carrier 10, and the fixed member 52 of the snap groove portion 50 and the positioning block 46 of the positioning member 42 of the snap portion 40 restrict the vertical movement of the multimedia storage carrier 10, so that the multimedia storage carrier 10 is fixed in the packaging container according to this embodiment.

Figure 8A:
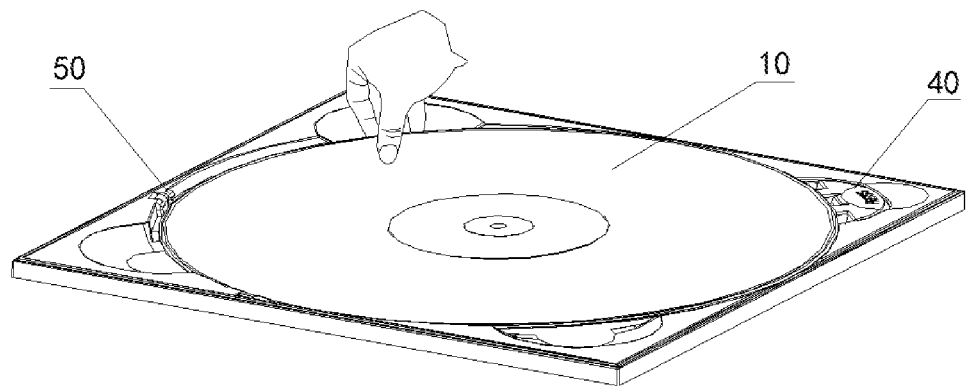
FIG. 8a is a first schematic view showing that the multimedia storage carrier is being taken out according to the first embodiment of the present application.
Figure 8B:
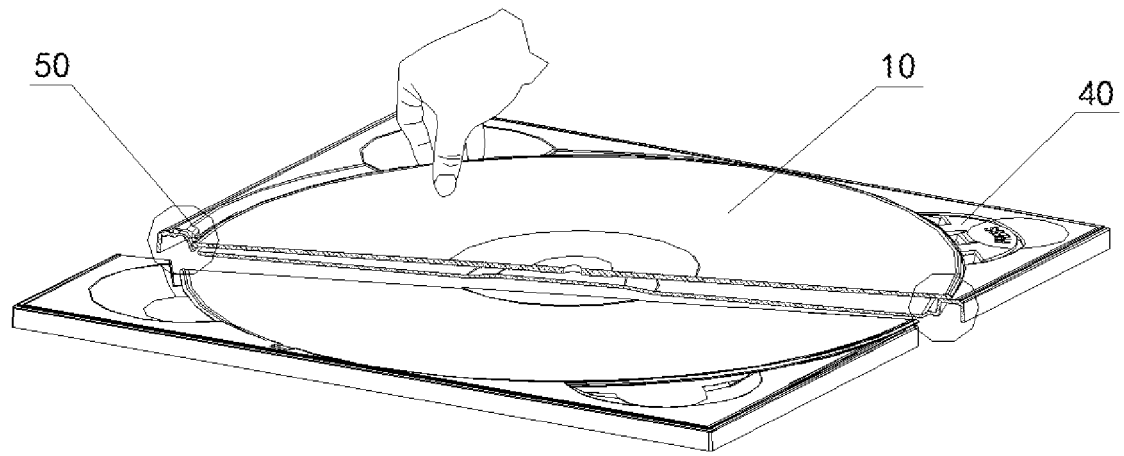
FIG. 8b is a second schematic view showing that the multimedia storage carrier is being taken out according to the first embodiment of the present application.
Figure 8C:
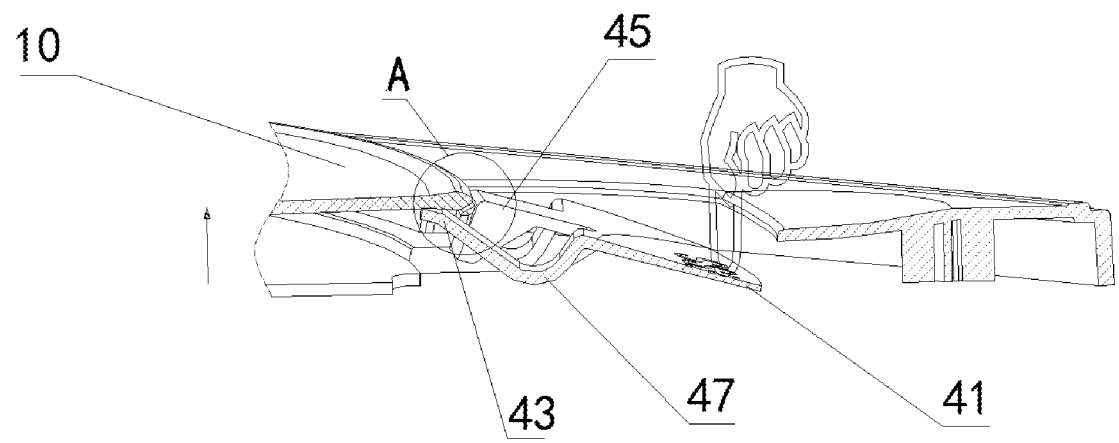
FIG. 8c is a schematic view showing a state of the snap portion when the multimedia storage carrier is being taken out according to the first embodiment of the present application.
Figure 8D:
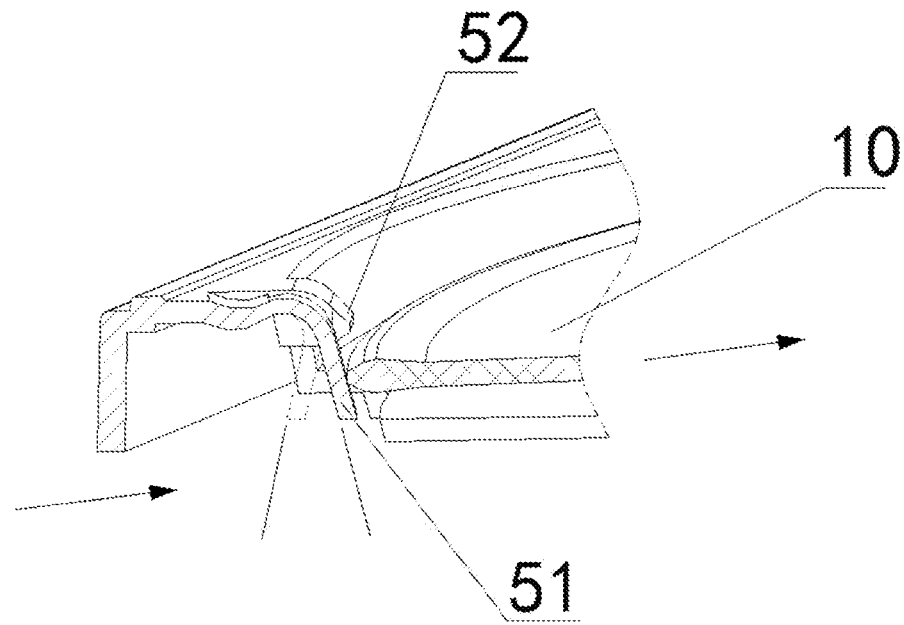
FIG. 8d is a schematic view showing a state of the snap groove portion when the multimedia storage carrier is being taken out according to the first embodiment of the present application.
Figure 8E:
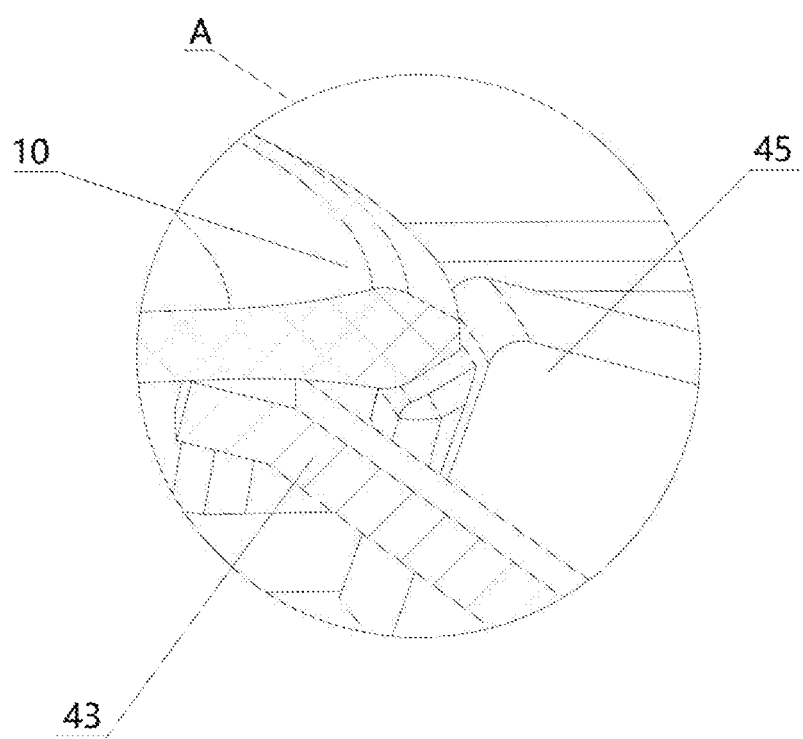
FIG. 8e is a partially enlarged view of the snap portion when the multimedia storage carrier is being taken out according to the first embodiment of the present application.

Referring to FIGS. 8a, 8b, 8c and 8d, when the multimedia storage carrier 10 is required to be taken out, a downward force is applied to the pressing member 41, the pressing member 41 moves downward, and the support member 43 and the positioning arms 45 move upward. Since the support member 43 abuts against the bottom surface of the multimedia storage carrier 10, the multimedia storage carrier 10 also moves upward. A moving path which the positioning arms 45 move in the vertical direction is arc-shaped. The peripheral portion of the multimedia storage carrier moves along the lower oblique surface of the positioning block 46, so when the positioning arms 45 move to a certain extent, the multimedia storage carrier 10 is separated from the positioning blocks 46, and the positioning blocks 46 can no longer restrict the movement of the multimedia storage carrier 10. At the moment when the multimedia storage carrier 10 is separated from the positioning arms 45, the multimedia storage carrier 10 is ejected out from the snap groove cavity by the movable member 51 of the snap groove portion 50. Meanwhile, referring to FIG. 8e, due to the elastic effect of the movable member 52, the section of the peripheral portion of the multimedia storage carrier locate in the snap portion 40 still abuts against the end faces of the positioning arms 45, so that the multimedia storage carrier will not be ejected out at the moment when the multimedia storage carrier is separated from the positioning blocks 46, but will stably abut against the end faces of the positioning arms 45. Thus the user can grasp the peripheral portion of the multimedia storage carrier 10 at the finger-shaped recesses 60 to take out the multimedia storage carrier.

Figure 9A:
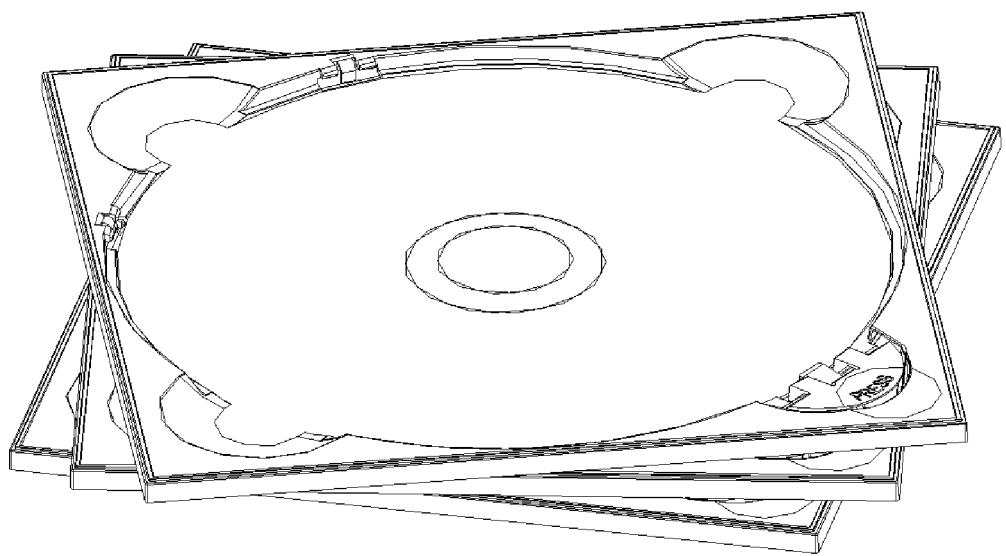
FIG. 9a is a schematic view showing the multiple stacked packaging containers according to the first embodiment of the present application are in a moving state.
Figure 9B:
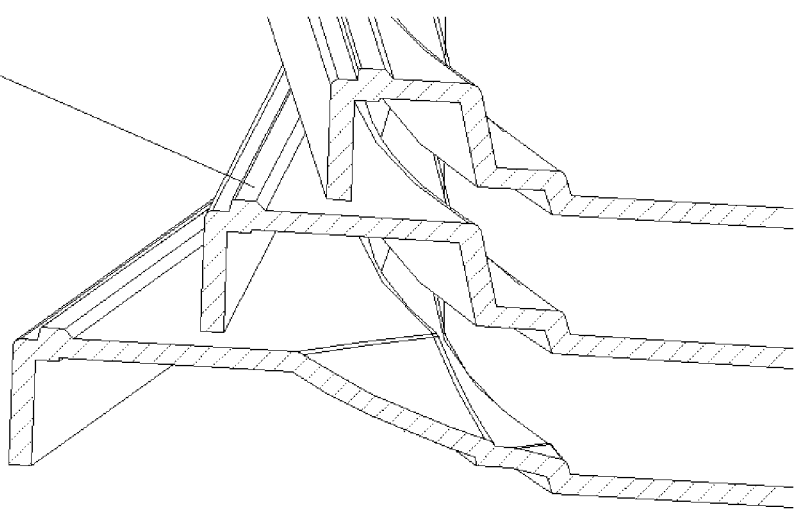
FIG. 9b is a schematic sectional view showing the multiple stacked packaging containers according to the first embodiment of the present application are in the moving state.

Referring to FIGS. 9a and 9b, the multimedia storage carrier packaging containers according to this embodiment are generally stored in a stacked manner. The peripheral side portion 30 is provided with the raised portion 70, and the raised portion 70 and the outer edge of the peripheral side portion 30 form the stepped groove 71. The outer wall of the peripheral side portion 30 of the upper packaging container can be placed in the stepped groove 71 of the lower packaging container, so that the packaging containers are more stable when stacked, and will not move randomly. When the packaging containers are moved, a bottom surface of the upper packaging container is in contact with the raised portion 70 of the peripheral side portion 30 of the lower packaging container, there will be a certain spatial distance between the bottom surface of the upper packaging container and the multimedia storage carrier in the lower packaging container, thus preventing the multimedia storage carrier from being scratched.

In summary, unlike the traditional protective container for the multimedia storage carrier, in this embodiment, there's no need to rely on the central support to fix the multimedia storage carrier, instead, with the cooperation between the snap groove portion and the snap portion, and the ingenious design of the support member and the positioning member of the snap portion, the multimedia storage carrier can be quickly fixed and released. Besides, the snap groove portion is provided with the elastic movable member, which on the one hand can tightly fix the multimedia storage carrier between the snap groove portion and the snap portion, and on the other hand can automatically eject the multimedia storage carrier from the snap groove portion when the multimedia storage carrier is required to be taken out, thus facilitating the removal operation. Compared with the packaging container having the central support, the multimedia storage carrier can be taken out or placed in smoother with the packaging container according to this embodiment, which can avoid damages to the multimedia storage carrier caused by the central support. Especially for large-sized multimedia storage carriers such as long plays (LP), with the packaging container according to this embodiment, there is no need to press against the central bracket while clamping the peripheral portion with a single hand, which is more inconvenient to place in and take out the multimedia storage carrier. In addition, in the this embodiment, the peripheral side portion is further provided with the raised portion, which provides a stepped groove for placing anther packaging container of the same type, and thus making the packaging container more stable when the packaging containers are stored in a stacked manner. More importantly, by providing the raised portion, in the case of moving the upper packaging container, since there is a certain spatial distance between the upper packing container and the multimedia storage carrier in the lower packaging container, the multimedia storage carrier in the lower packaging container will not be scratched and thus the data therein will not be damaged.

Second Embodiment

This embodiment differs from the first embodiment in the following aspects.

Figure 10A:
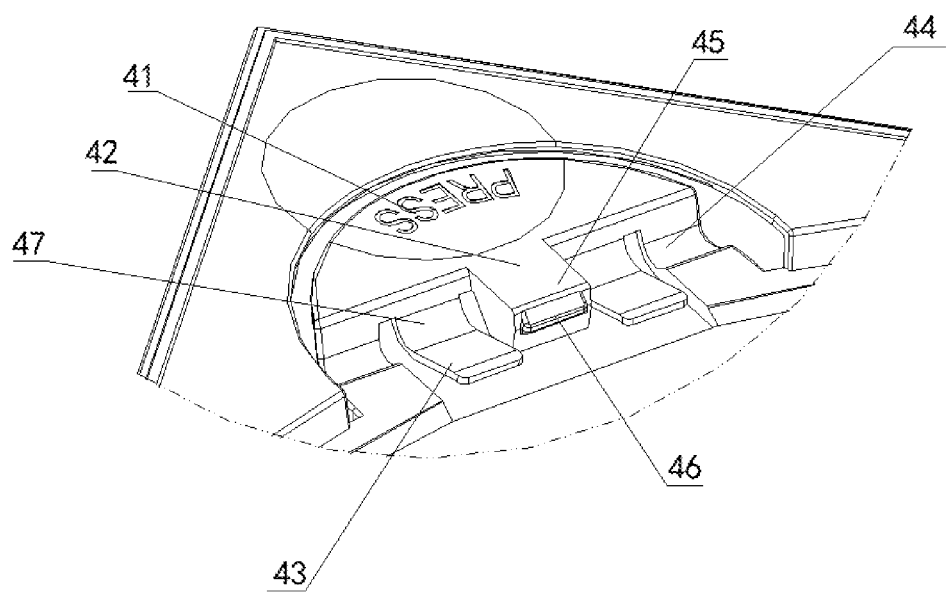
FIG. 10a is a schematic structural view showing a snap portion according to a second embodiment of the present application.
Figure 10B:
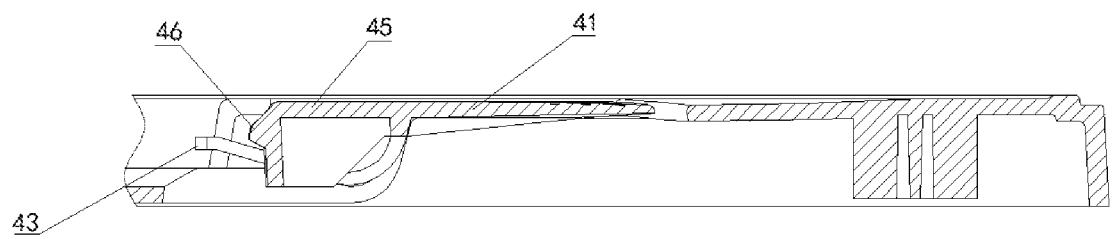
FIG. 10b is a schematic sectional view showing the snap portion according to the second embodiment of the present application.

Referring to FIGS. 10a and 10b, the snap portion 40 according to this embodiment includes one positioning arm 45 and two support members 43, and the positioning arm 45 is arranged between the two support members 43. Compared with the first embodiment, with a combination of one positioning arm 45 and two support members 43 according to this embodiment, it will be smother when the multimedia storage carrier is being taken out, which saves labor for the user. Of course, according to different sizes and types of multimedia storage carriers, the positioning arm and the support member may be provided in other combinations, for example, a combination of one positioning arm and one support member.

Figure 11A:
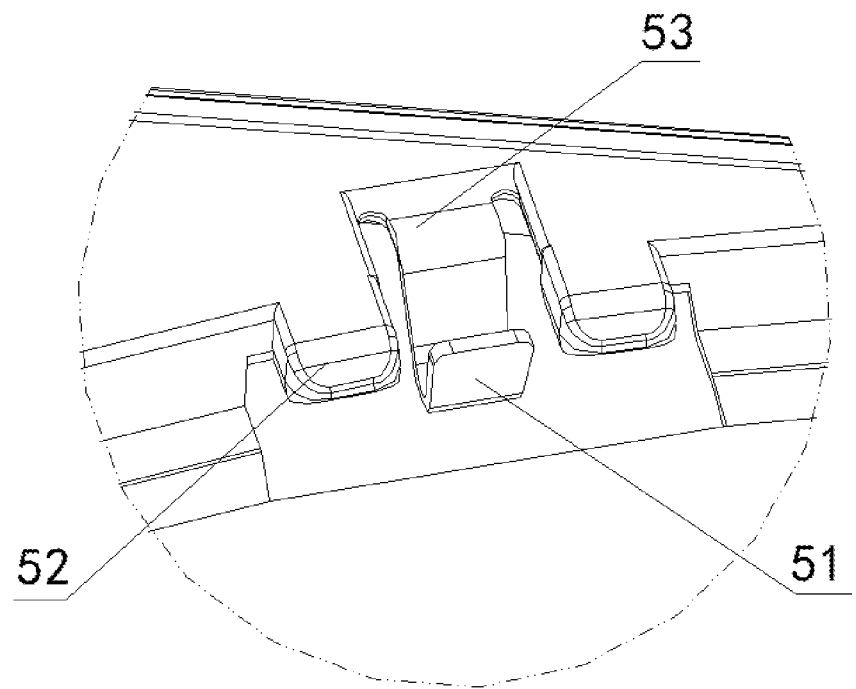
FIG. 11a is a schematic structural view showing a snap groove portion according to the second embodiment of the present application.
Figure 11B:
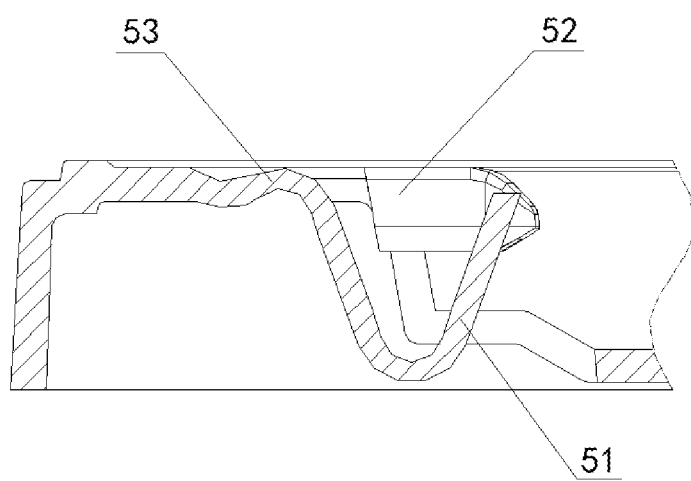
FIG. 11b is a schematic sectional view showing the snap groove portion according to the second embodiment of the present application.

Referring to FIGS. 11a and 11b, the movable member 51 of the snap groove portion 50 of the present embodiment has a V-shaped structure with an upward opening, and a bottom of the V-shaped structure is arc-shaped. One arm of the movable member 51 is connected to the peripheral side portion 30 via a second bent portion 53 provided on the movable member 51, and another arm of the movable member 51 is configured to abut against the multimedia storage carrier to function as a force applying portion. The second bent portion 53 has an S-shaped double-curve structure. Different from the first embodiment, in this embodiment, the movable member 51 is provided in a V-shaped structure and connected to the peripheral side portion 30 via the second bent portion 53 having the S-shaped structure, so that the movable member 51 of this embodiment can be more flexible and resilient, and thus the multimedia storage carrier can be taken out smoother.

Finally, it should be noted that the above embodiments are only intended to describe the technical solutions of the application, but not to limit the scope of the application. Although the application is described in detail with reference to the above embodiments, it should be understood by those ordinal skilled in the art that modifications can be made to the technical solutions recorded in the above embodiments or equivalent replacements can be made to some or all of the technical features thereof, which modifications and equivalent replacements will not make the corresponding technical solutions deviate from the scope of the technical solutions of the embodiments of the application.

The invention claimed is:

1. A packaging container for a multimedia storage carrier, comprising:

a panel portion and a peripheral side portion, wherein the panel portion is arranged in the peripheral side portion, and an inner cavity configured for accommodating a multimedia storage carrier is defined by the panel portion and an inner wall of the peripheral side portion; the peripheral side portion is provided with a snap portion and a snap groove portion opposite to the snap portion, and the snap portion and the snap groove portion are configured to fix the multimedia storage carrier in the inner cavity; and the snap portion is provided with a support member configured to abut against a bottom surface of the multimedia storage carrier, and in a case that the support member moves downward, the snap portion is allowed to be snap-fitted with the multimedia storage carrier, and in a case that the support member moves upward, the support member is configured to drive the multimedia storage carrier to separate from the snap portion, wherein the snap portion further comprises a positioning member configured to be snap-fitted with a peripheral portion of the multimedia storage carrier and a pressing member configured to apply force, and the support member and the positioning member are respectively connected to the pressing member, and wherein the positioning member comprises at least one positioning arm, one end of the positioning arm is connected to the pressing member, another end of the positioning arm is provided with an end face matching with the inner wall of the peripheral side portion, the end face is provided with a positioning block protruding outward, and an outer end of the positioning block has an upper oblique surface and a lower oblique surface.

2. The packaging container according to claim 1, wherein an arm member is arranged at the pressing member, the pressing member is connected to the panel portion via the arm member, and a portion of the pressing member away from the arm member is in a suspended state.

3. The packaging container according to claim 1, wherein the number of the support member is at least one, one end of the support member is configured to abut against the bottom surface of the multimedia storage carrier, and another end of the support member is connected to the pressing member via a first bent portion provided on the support member.

4. The packaging container according to claim 1, wherein at least two snap groove portions are provided, which are symmetrically arranged at a portion of the peripheral side portion opposite to the snap portion.

5. The packaging container according to claim 4, wherein two snap groove portions are provided, and a central angle formed by the two snap groove portions and a center of the panel portion ranges from 0 degree to 270 degrees.

6. The packaging container according to claim 1, wherein the peripheral side portion is provided with at least one finger-shaped recess which is convenient for a user to grasp a peripheral portion of the multimedia storage carrier.

7. The packaging container according to claim 1, wherein the peripheral side portion is provided with at least one raised portion having an annular structure, a stepped groove is formed by the raised portion and an outer edge of the peripheral side portion, and the stepped groove is configured for placing an outer wall of the peripheral side portion of another adjacent packaging container.

8. The packaging container according to claim 1, wherein a stepped portion for supporting a peripheral portion of the multimedia storage carrier is provided at a junction between the panel portion and the peripheral side portion.

9. The packaging container according to claim 1, wherein a central column portion configured to be coupled to a central hole of the multimedia storage carrier is provided at a center of the panel portion.

10. A packaging container for a multimedia storage carrier, comprising:

a panel portion and a peripheral side portion, wherein the panel portion is arranged in the peripheral side portion, and an inner cavity configured for accommodating a multimedia storage carrier is defined by the panel portion and an inner wall of the peripheral side portion;

the peripheral side portion is provided with a snap portion and a snap groove portion opposite to the snap portion, and the snap portion and the snap groove portion are configured to fix the multimedia storage carrier in the inner cavity; and the snap portion is provided with a support member configured to abut against a bottom surface of the multimedia storage carrier, and in a case that the support member moves downward, the snap portion is allowed to be snap-fitted with the multimedia storage carrier, and in a case that the support member moves upward, the support member is configured to drive the multimedia storage carrier to separate from the snap portion, wherein the snap groove portion comprises a fixed member and a movable member, a snap groove cavity configured for accommodating the peripheral portion of the multimedia storage carrier is defined by the fixed member, the inner wall of the peripheral side portion and the panel portion, and the movable member is an elastic member which is configured to apply force to the multimedia storage carrier, to drive the multimedia storage carrier to move out from the snap groove cavity, and wherein the fixed member protrudes from the inner wall of the peripheral side portion toward the panel portion, and a front end of the fixed member has an upper oblique surface and a lower oblique surface.

11. The packaging container according to claim 10, wherein the movable member has an arc-shaped sheet structure, one end of the movable member is connected with the peripheral side portion, and another end of the movable member extends downward, the movable member is insertedly arranged in the fixed member, and the end of the movable member extending downward is in a suspended state.

12. The packaging container according to claim 10, wherein the movable member has a V-shaped structure, an opening of the movable member is upward, a bottom of the movable member has an arc-shaped structure, one end of the movable member is connected with the peripheral side portion, and another end of the movable member is in a suspended state.

13. The packaging container according to claim 11, wherein the movable member is provided with a second bent portion having an S-shaped double-curve structure, and the movable member is connected to the peripheral side portion via the second bent portion.

* * * * *